United States Patent
Liu et al.

(10) Patent No.: US 8,475,029 B2
(45) Date of Patent: Jul. 2, 2013

(54) BACKLIGHT MODULE AND LIQUID CRYSTAL DEVICE USING THE SAME

(75) Inventors: Huang-Chun Liu, Taoyuan (TW); Sheng-Ju Chung, Taoyuan (TW); Chung-Cheng Liang, Taoyuan (TW); Wei-An Hua, Taoyuan (TW)

(73) Assignee: Global Lighting Technologies, Inc., Taoyuan (TW)

( * ) Notice: Subject to any disclaimer, the term of this patent is extended or adjusted under 35 U.S.C. 154(b) by 169 days.

(21) Appl. No.: 13/245,754

(22) Filed: Sep. 26, 2011

(65) Prior Publication Data
US 2012/0169969 A1 Jul. 5, 2012

Related U.S. Application Data

(63) Continuation-in-part of application No. 12/980,423, filed on Dec. 29, 2010.

(51) Int. Cl.
*F21V 7/04* (2006.01)

(52) U.S. Cl.
USPC ............ 362/612; 362/616; 362/620; 362/626

(58) Field of Classification Search
USPC .................. 362/612, 616, 620, 626
See application file for complete search history.

(56) References Cited

U.S. PATENT DOCUMENTS

2007/0086179 A1* 4/2007 Chen et al. ...................... 362/27

* cited by examiner

*Primary Examiner* — Jason Moon Han
(74) *Attorney, Agent, or Firm* — Chun-Ming Shih; HDLS IPR Services

(57) ABSTRACT

A backlight module includes a light guide plate with a main body and a light source with a circuit board and a plurality of light bars. The main body has a light incidence surface and a light emitting surface. The light incidence surface has a plurality of accommodating grooves and the light emitting surface or the light incidence surface has a plurality of light-separation grooves which are perpendicular to the accommodating grooves. The accommodating groove has a first and a second light incidence parts. A reflecting layer is disposed on the surface of the circuit board being located between each two light bars. The light source is disposed on the light incidence surface and light bars are disposed for the accommodating grooves so as a predetermined distance located between the light bar and the second light incidence part is formed a light mixing space to reduce the production of bright lines.

12 Claims, 14 Drawing Sheets

BACKLIGHT MODULE AND LIQUID CRYSTAL DEVICE USING THE SAME

The application is a continuation-in-part of U.S. patent application Ser. No. 12/980,423, filed Dec. 29, 2010.

BACKGROUND OF THE INVENTION

1. Field of the Invention

The present invention relates to a backlight module, and in particular to a backlight module with light-separation effect.

2. Description of Prior Art

A general LCD TV with light emitting diode (LED) backlight module is still remaining high cost, but the LED backlight module is considered to be a main development for the backlight source of the LCD TV after it is used for the backlight source of the notebook computers. In more particularly, the direct type of LED backlight with local dimming technology has advantages of lower power consumptions, increased display contract ratio, higher gray scale numbers and reduced dynamic image blur, among other types of light sources and will be difficult to replace by other types of light sources.

The local dimming technology of the LCD is region control technologies, which achieves backlight supplying for the LCD in different regions and different luminance levels. In order to achieve light-separation, a general backlight module includes a plurality of small size light guide plates, where the light guide plates are connected together to form a large light emitting plane.

Even the backlight light module with tiled light guide plate effectively achieves light-separation, bright lines (luminescent lines) are also produced, which are difficult to eliminate between the joint of the adjacent light guide plates.

SUMMARY OF THE INVENTION

Accordingly, the present invention provides a backlight module for eliminating bright lines and achieving local dimming for separating light and uniformity the intensity of the light guide plate of the backlight module.

Therefore, the present invention provides a backlight module, the backlight module includes a light guide plate and a light source. The light guide plate has a main body. The main body has a light incidence surface and a light emitting surface opposite to the light incidence surface. The main body has a plurality light-separation grooves. The light incidence surface has a plurality of accommodating grooves, each accommodating grooves has a first light incidence part and a second light incidence part being extended from a side of the first light incidence part, the light-separation grooves are perpendicular to the accommodating grooves and optically separating the light emitting surface into a plurality of light guide surface. The light source includes a circuit board and a plurality of light bars electrically connected thereto. The light source is disposed on the light incidence surface of the main body of the light guide plate and the light bars are disposed in the accommodating grooves, wherein a predetermined distance located between the light bar and the second light incidence part forms a light mixing space.

According to a preferred embodiment of the invention, wherein the main body has a plurality of through-holes which are corresponding to the holes being disposed on the circuit board.

According to a preferred embodiment of the invention, the backlight module further includes a base and a supporting element, the base has a platform on its inner surface and a plurality of fastening holes disposed on the surface of the platform, the supporting element passes through the through-holes, the holes and the fastening holes for fastening the backlight module on the platform.

According to a preferred embodiment of the invention, wherein the supporting element further includes an optical module, the optical module comprising a dual brightness enhancement film, a brightness enhancement film, a diffuser and a diffusing plate.

According to a preferred embodiment of the invention, wherein an optical layer is disposed on the first light incidence part and the optical layer is one of the reflector with penetrability and a diffuser.

According to a preferred embodiment of the invention, wherein a reflecting layer is disposed on the circuit board being located between each two light bars, the reflecting layer is adjacent to the light bar is disposed in the accommodating groove.

According to a preferred embodiment of the invention, wherein the light-separation grooves are disposed on the light emitting surface.

According to a preferred embodiment of the invention, wherein the light-separation grooves are disposed on the light incidence surface.

According to a preferred embodiment of the invention, wherein the light bar is composed of a plurality of light emitting diode.

Moreover, the present inventions a liquid crystal displaying device, the liquid crystal displaying device includes a backlight module, a light source and a liquid crystal displaying layer. The backlight module includes a light guide plate having a main body, the main body has a light incidence surface and a light emitting surface opposite to the light incidence surface. The main body includes a plurality of light-separation grooves. The light incidence surface includes a plurality of accommodating grooves and the accommodating grooves have a first light incidence part and a second light incidence part being extended from one side of the first light incidence part. The light-separation grooves are perpendicular to the accommodating grooves and optically separating the light emitting surface into a plurality light guide surface. The light source includes a circuit board and a plurality of light bars electrically connected thereto. The light source is disposed on the light incidence surface of the main body of the light guide plate and the light bars are disposed in the accommodating grooves, wherein a predetermined distance located between the light bar and the second light incidence part forms a light mixing space. The liquid crystal displaying layer is disposed on the backlight module.

According to a preferred embodiment of the invention, wherein an optical layer is disposed on the first light incidence part and the optical layer is one of the reflector with penetrability and a diffuser.

According to a preferred embodiment of the invention, wherein the light-separation grooves are disposed on the light incidence surface of the main body.

According to a preferred embodiment of the invention, wherein the light-separation grooves are disposed on the light incidence surface of the main body.

According to a preferred embodiment of the invention, wherein a reflecting layer is disposed on the circuit board being located between each two light bars, the reflecting layer which is adjacent the light bar is disposed for the accommodating groove.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings. Hereinafter, a light incident surface is one surface where at least a light source is disposed on. A light emitting surface is one surface which is opposite to the light incident surface and for allowing light emitting from.

Figure 1:
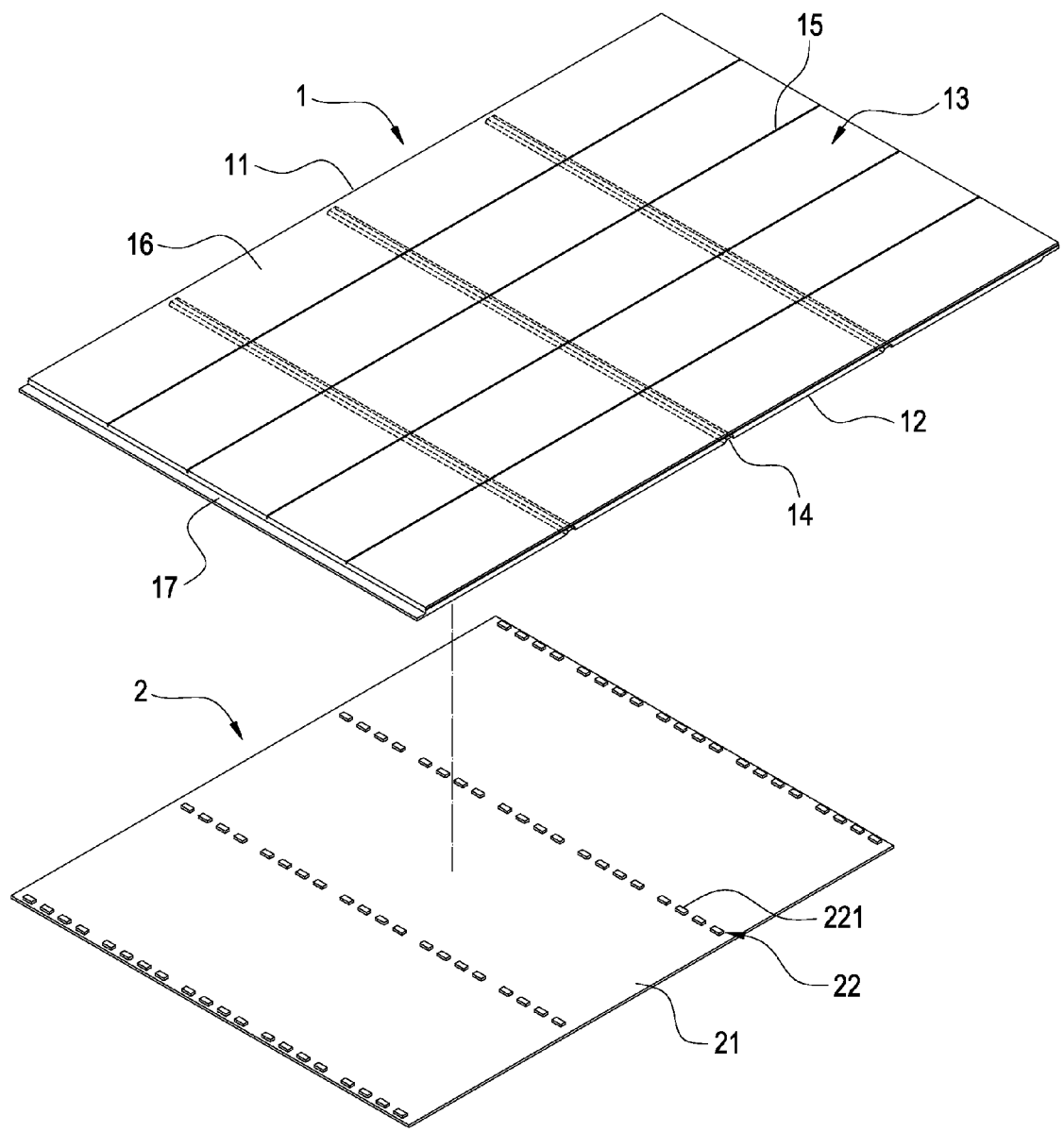
FIG. 1 is an exploded perspective view of a backlight module according to a first embodiment of the present invention.
Figure 2:
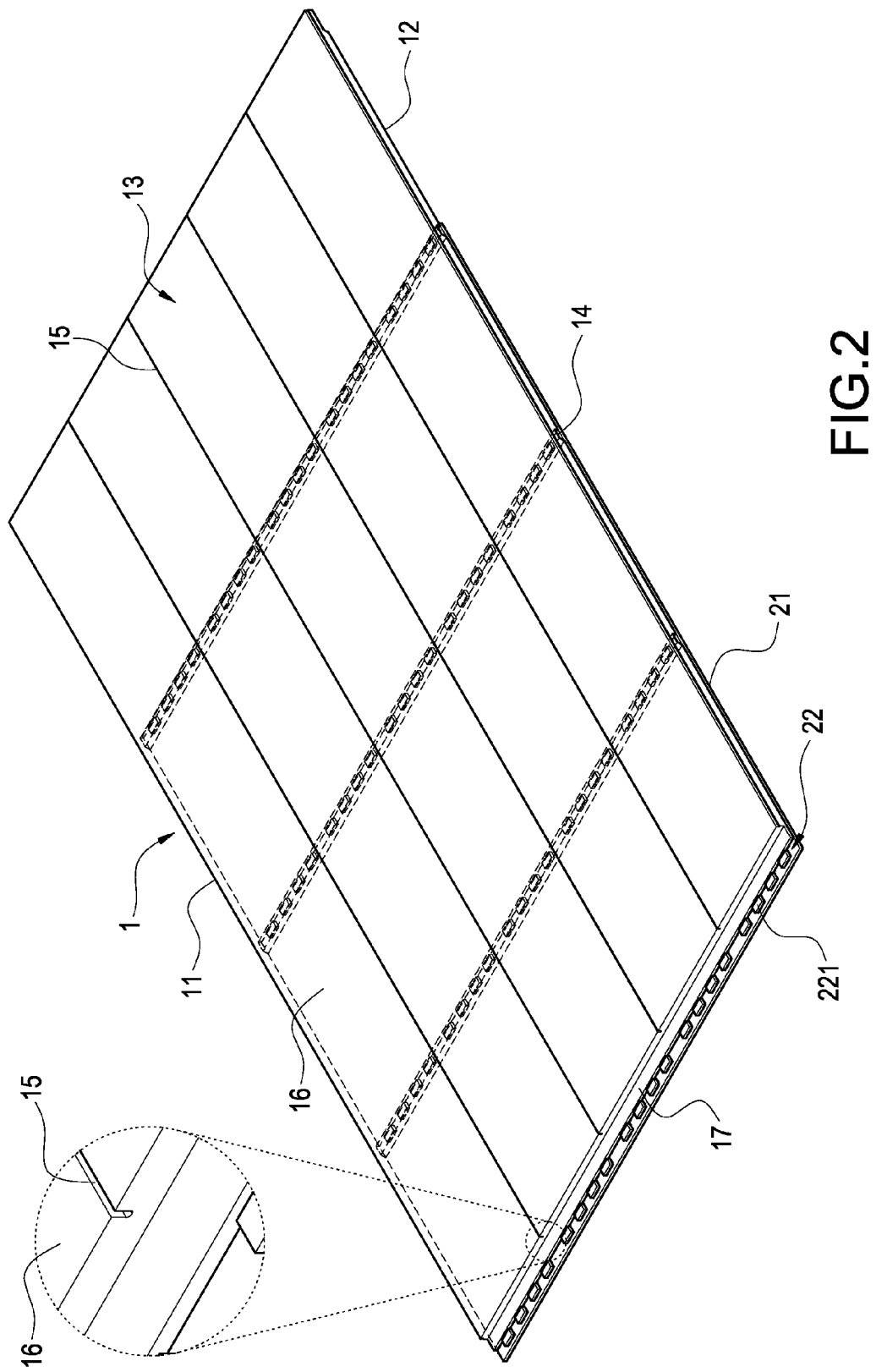
FIG. 2 is an assemble view of the backlight module according to a first embodiment.

Reference is made to FIG. 1 and FIG. 2, which are an exploded perspective view and an assemble view of a backlight module according to a first embodiment of the present invention, respectively. The planar backlight module includes a light guide plate 1 and a light source 2.

The light guide plate 1 has a main body 11. The main body 11 has a light incidence surface 12 and a light emitting surface 13. A plurality of accommodating grooves 14 are provided lengthwise-continuously on the light incidence surface 12 (namely, each accommodating grooves 14 is continuously extending along the longitudinal direction of the light incident surface 12). Each accommodating groove 14 has one of U shape and trapezoid shape cross-section. A plurality of light-separation grooves 15 which are perpendicular to the accommodating grooves 14 are provided lengthwise-continuously on the light emitting surface 13. The accommodating grooves 14 and the light-separation grooves 15 collectively define a plurality of local and small light guide surface 16 at the main body 11. Each light-separation groove 15 has one of V shape and U shape cross-sections. In addition, one side or two sides of the main body 11 has one light guide part 17 or two light guide parts 17, respectively, for guiding external light.

The light source 2 includes a circuit board 21 and a plurality of light bars 22. Each light bar 22 is welded on the circuit board 21 and composed of a plurality of light emitting diodes (LEDs) 221. When the light source 2 is assembled to the main body 11 of the light guide plate 1, the circuit board 21 of the light source 2 is disposed on the light incidence surface 12 of the main body 11 such that the light bars 22 are disposed in the corresponding accommodating grooves 14 and on one side of the light guide part 17.

Figure 3:
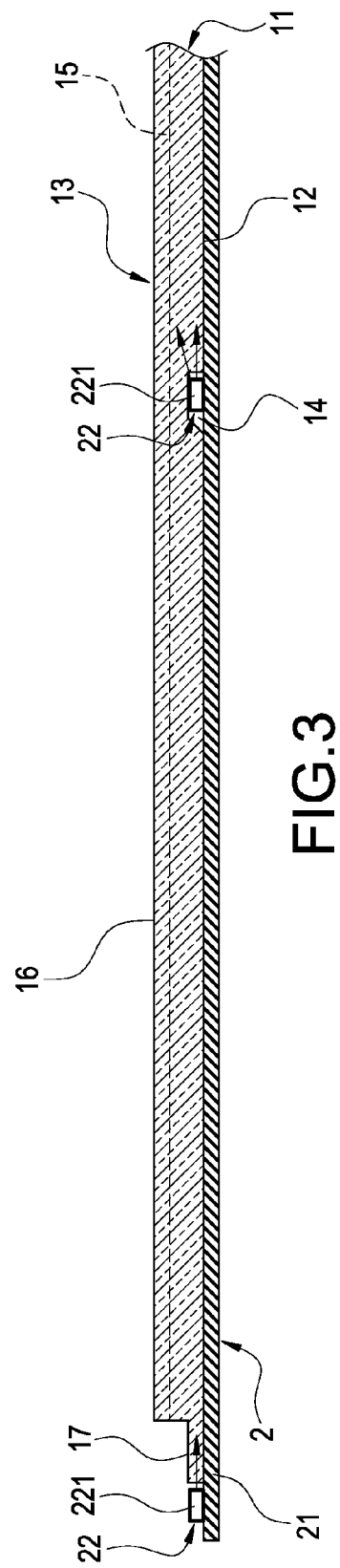
FIG. 3 is a cross-section view of the backlight module according to a first embodiment.
Figure 4:
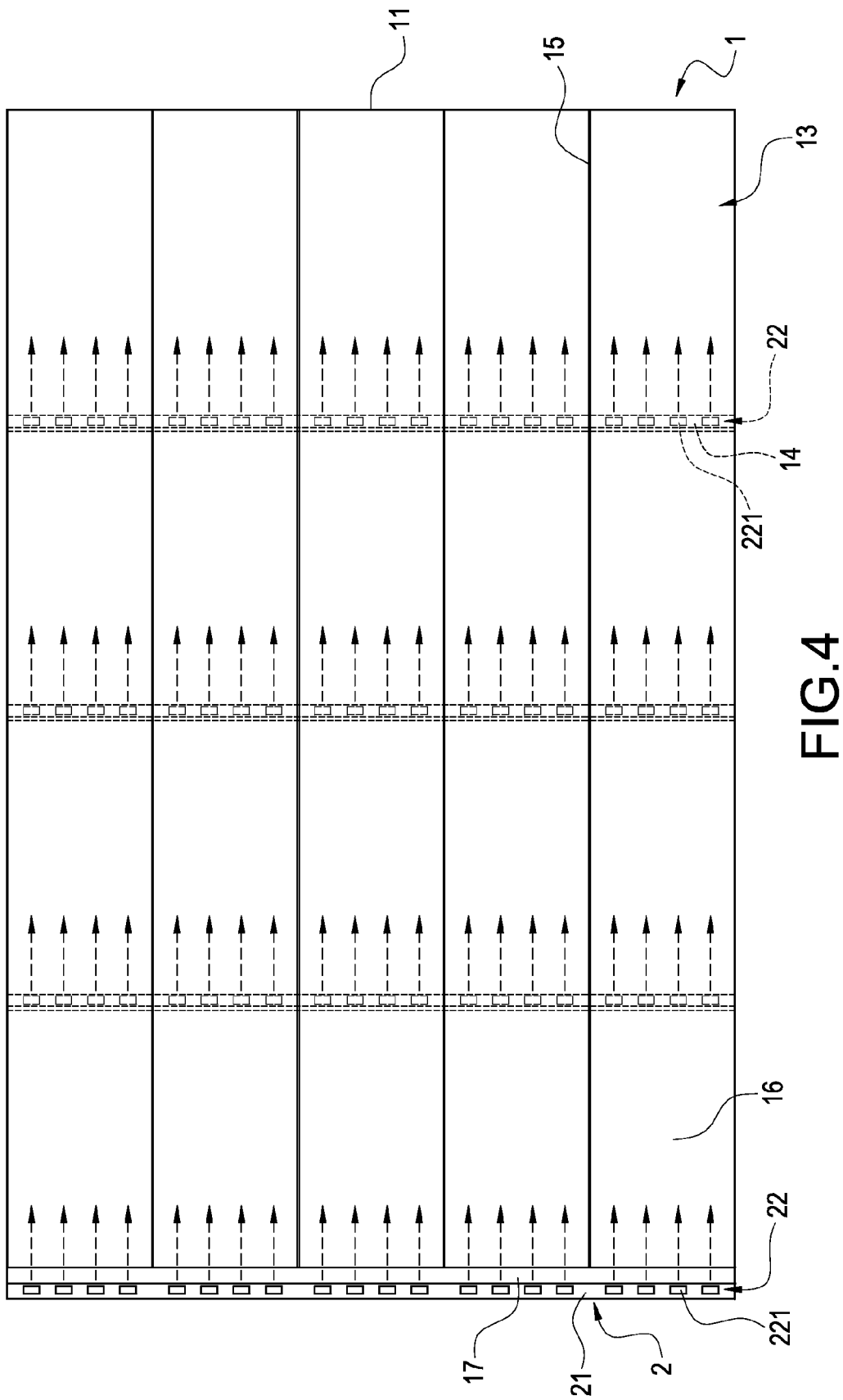
FIG. 4 is a top view of the backlight module according to a first embodiment.

Reference is made to FIG. 3 and FIG. 4, which are a cross-section view and a top view of a backlight module according to the first embodiment of the present invention, respectively. When the main body 11 of the light guide plate 1 and the light source 2 are assembled, the light bars 22 of the light source 2 can be clearly observed to dispose in the accommodating grooves 14. When the LEDs 221 of each light bar 22 are illuminated, the light is emitted into the main body 11 for irradiating thereof. At this time, the light-separation grooves 15 prevent the light injected into the main body 11 from entering another light guide surface 16 adjacent to this light guide surface 16 to effectively separate light diffusing at the light guide surface 16.

Figure 5:
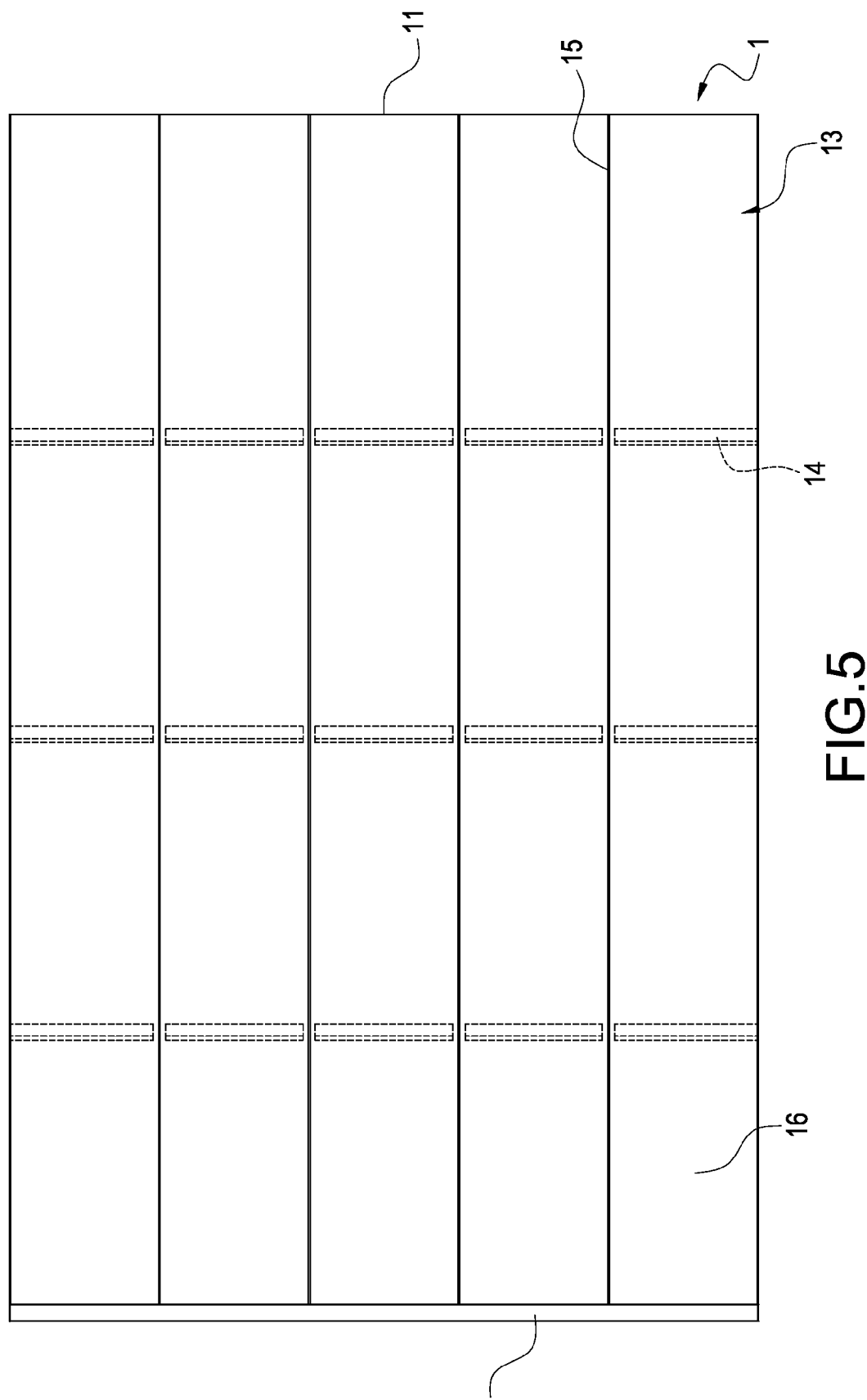
FIG. 5 is a top view of a light guide plate according to a second embodiment.

Reference is made to FIG. 5, which is a top view of a light guide plate according to a second embodiment of the present invention. A plurality of light-separation grooves 15 are provided lengthwise-continuously on the light emitting surface 13, and a plurality of accommodating grooves 14 are provided lengthwise-discontinuously in the light incidence surface 12 (namely, each accommodating grooves 14 is discontinuously extending along the longitudinal direction of the light incident surface 12).

Figure 6:
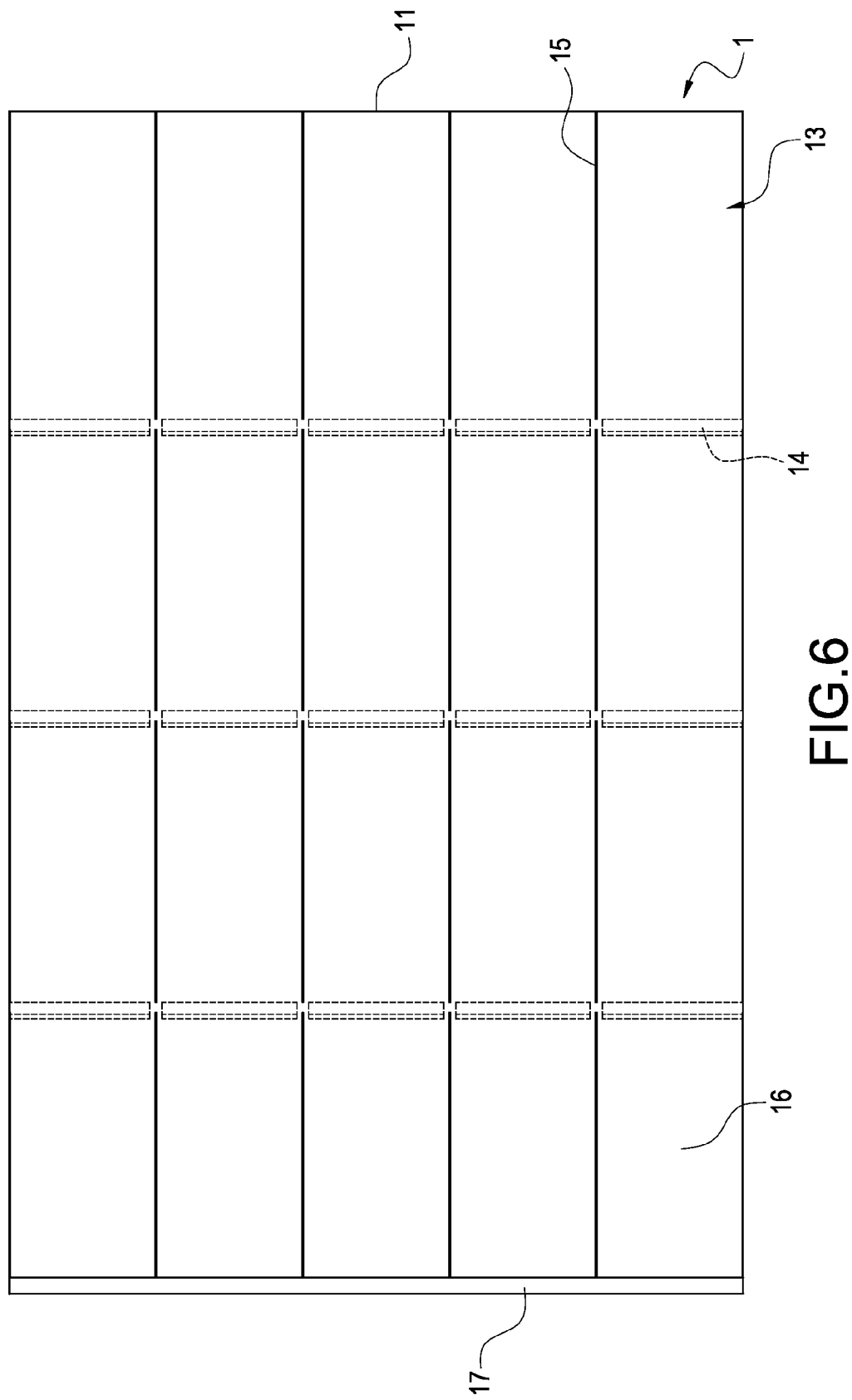
FIG. 6 is a top view of a light guide plate according to a third embodiment.

Reference is made to FIG. 6, which is a top view of a light guide plate according to a third embodiment. A plurality of light-separation grooves 15 are provided lengthwise-discontinuously on the light emitting surface 13, and a plurality of accommodating grooves 14 are provided lengthwise-discontinuously in the light incidence surface 12.

Figure 7:
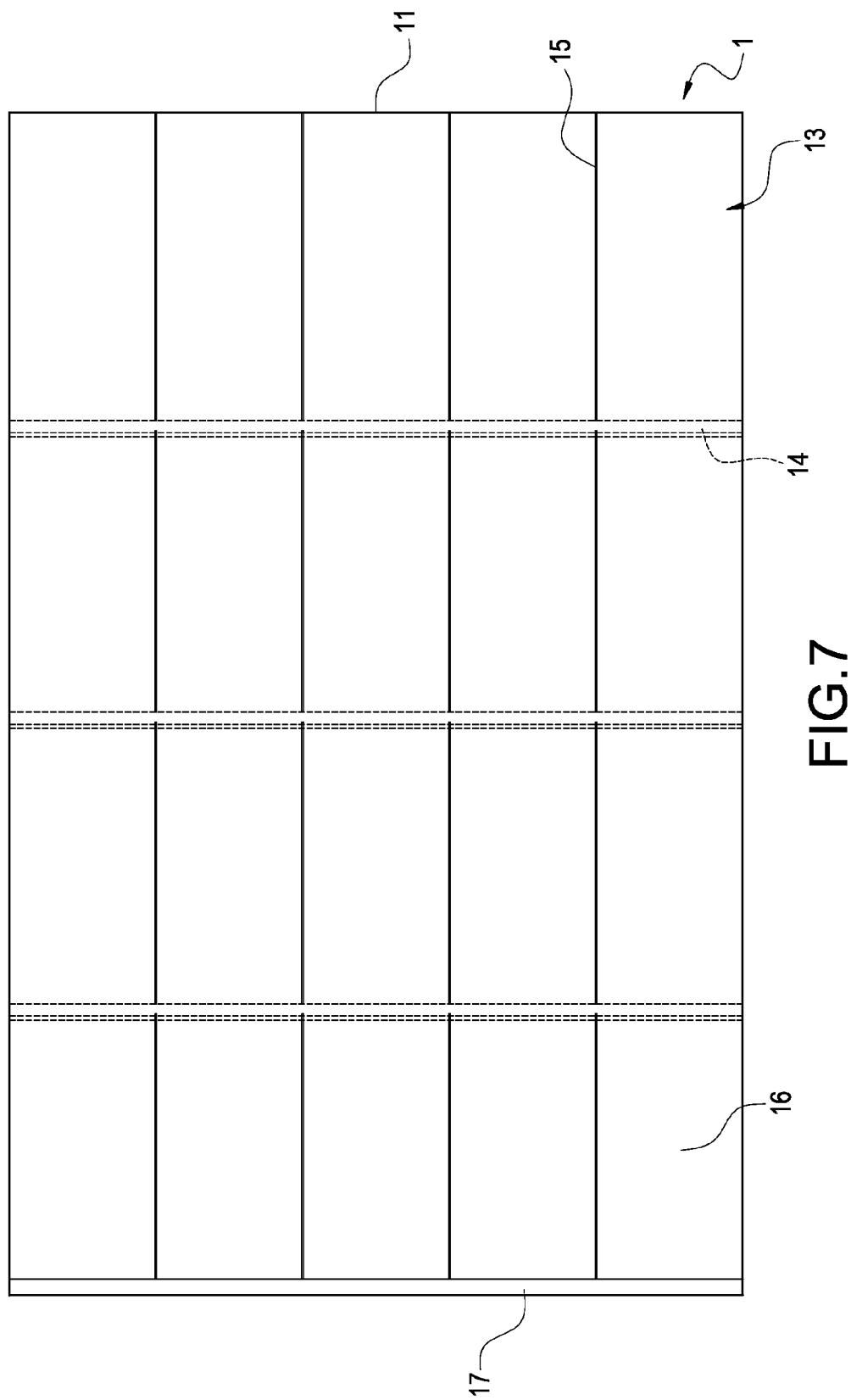
FIG. 7 is a top view of a light guide plate according to a fourth embodiment.

Reference is made to FIG. 7, which is a top view of a light guide plate according to a fourth embodiment of the present invention. A plurality of light-separation grooves 15 are provided lengthwise-discontinuously on the light emitting surface 13, and a plurality of accommodating grooves 14 are provided lengthwise-continuously in the light incidence surface 12.

As in above description, when the light guide plate with a plurality of light-separation grooves (V shape cross-section) is employed in the local dimming technology, the darkness light guide block corresponding to the light guide surface said above can effectively separates the light injected from adjacent irradiation light guide block. In addition, different light-separation results can be achieved by combining different forms of grooves.

Figure 8:
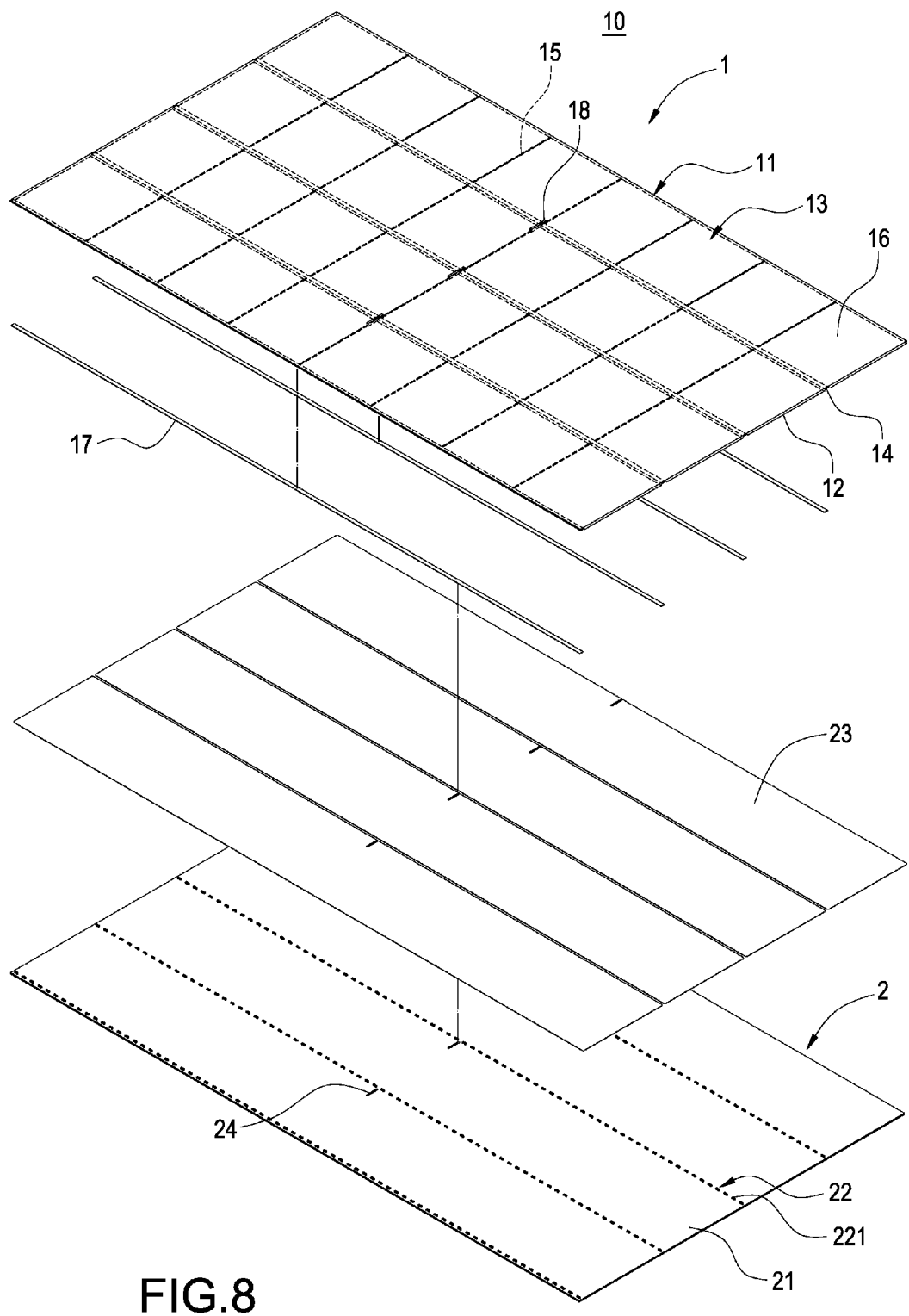
FIG. 8 is an exploded perspective view of backlight module according to the fifth embodiment of the present invention.
Figure 9:
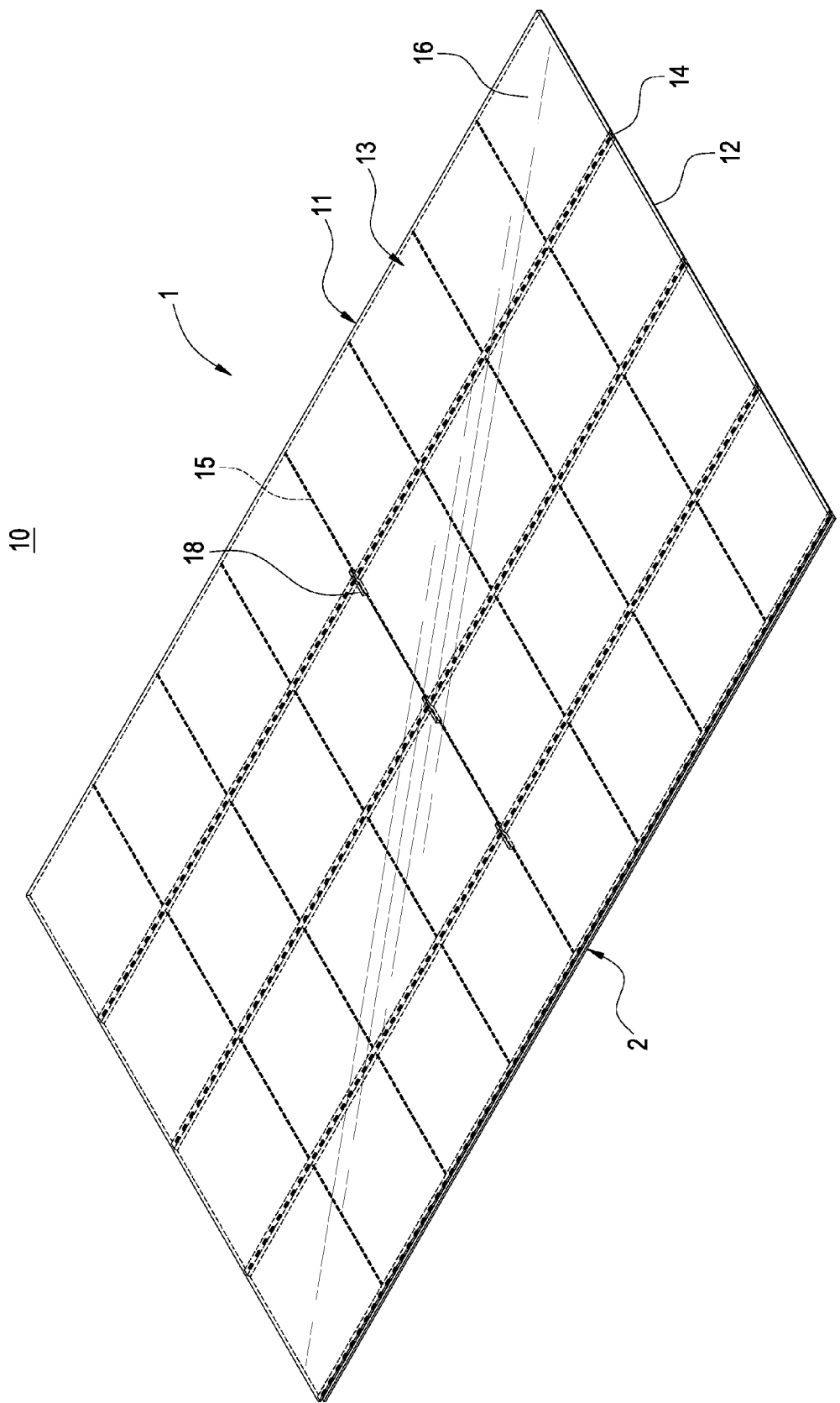
FIG. 9 is a assemble view of the backlight module according to the fifth embodiment.
Figure 10:
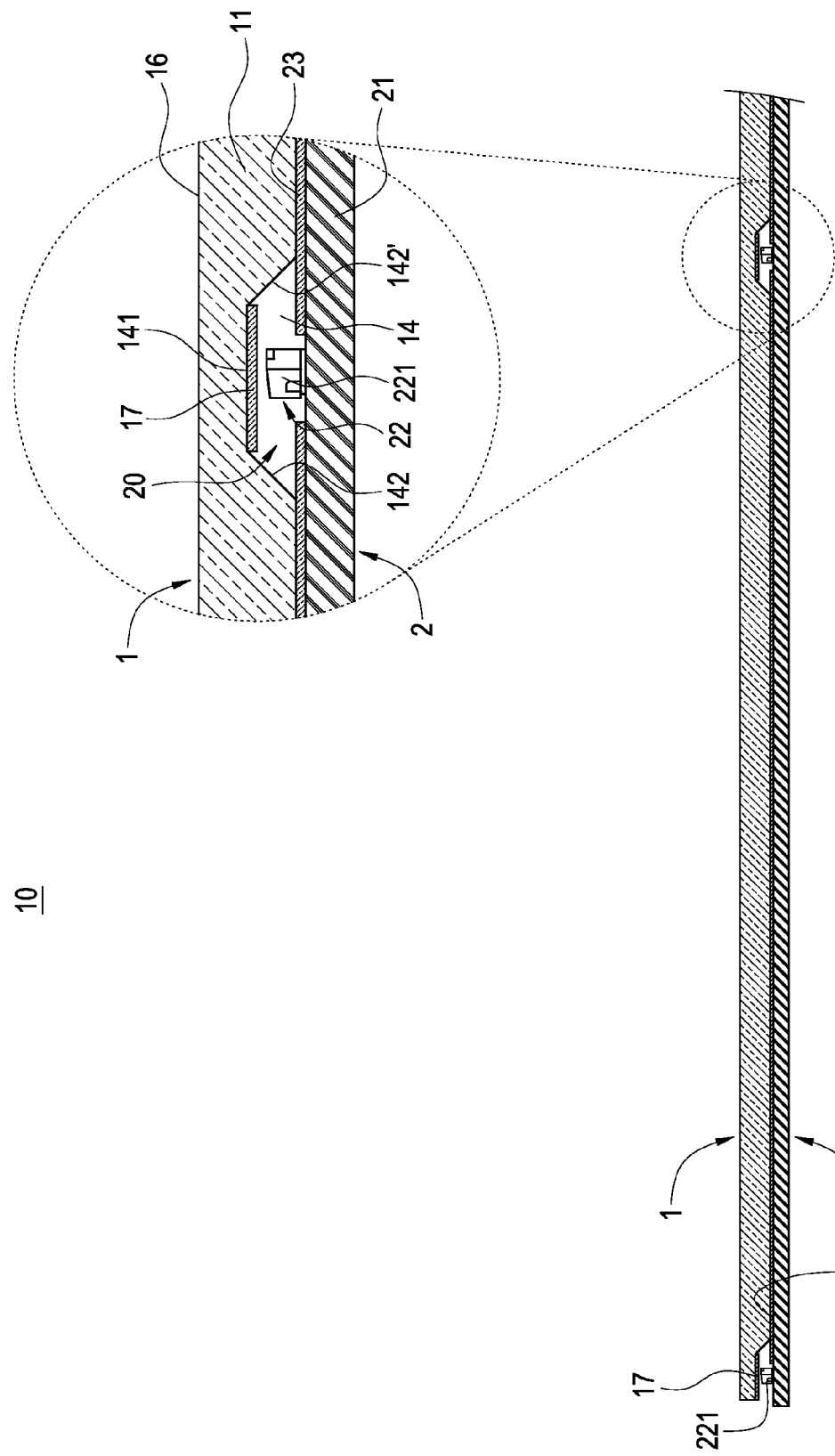
FIG. 10 is a cross sectional view of the backlight module according to the fifth embodiment.
Figure 11:
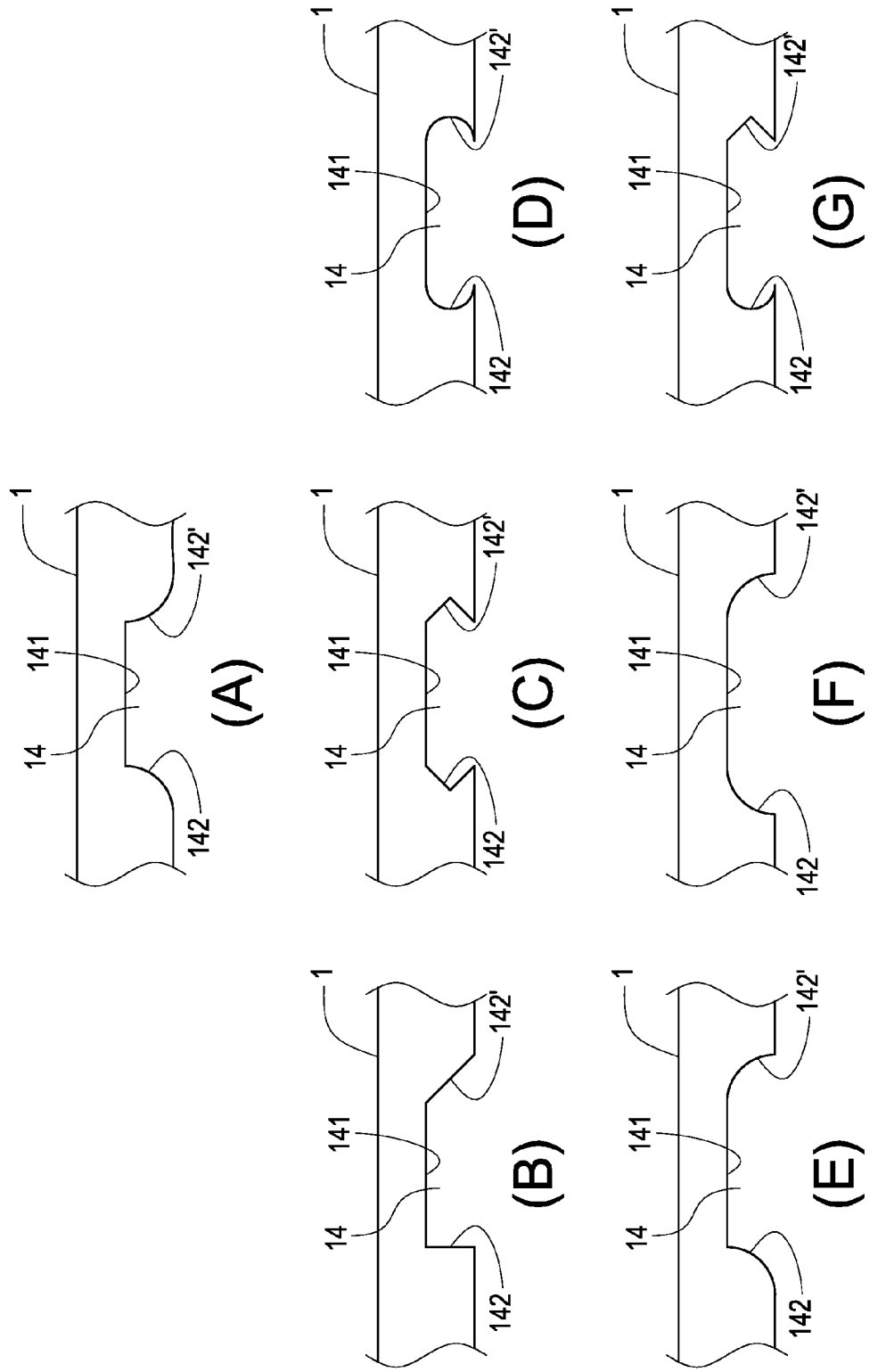
FIG. 11a to FIG. 11g are cross sectional views of the accommodating grooves of the light guide plate.

Reference is made to FIG. 8, FIG. 9 and FIG. 10, which are an exploded perspective view, an assembled view and a cross sectional view of backlight module according to the fifth embodiment of the present invention. In order to effectively prevent bright lines and achieve local dimming for light-separation, a backlight module 10 of the present invention includes a light guide plate 1 and a light source 2.

The light guide plate 1 has a main body 11, the main body 11 has a light incidence surface 12 and a light emitting surface 13. The light incidence surface 12 has a plurality of accommodating grooves 14 having a trapezoid shape cross-section. The light emitting surface 13 or the light incidence surface 12 has a plurality of light-separation grooves 15 which are perpendicular to the accommodating grooves 14, for optically separating the light emitting surface 13 into a plurality of local and small light guide surfaces 16. A first light incidence part 141 is disposer inner the accommodating grooves 14, and at least a second light incidence part 142 or 142' is extended from at least a side of the first light incidence part 141. An optical layer 17 is disposed on the first light incidence part 141, the optical layer 17 may be one of a reflector with penetrability and a diffuser. The main body 11 of the light guide plate 1 has a plurality of through-holes 18 for allowing a plurality of supporting element (not shown) passing through.

Reference is made to FIG. 11a to FIG. 11g, which are cross sectional views of the accommodating grooves of the light guide plate according to the present invention. The accommodating grooves 14 may have a trapezoid shape cross-section as mentioned above. Besides, the second light incidence part 142 and 142' of the accommodating grooves 14 may be perpendicular to or tilted to the first light incidence part 141, or the second light incidence part 142 and 142' may be of arc shape or rhombus shape connected to the first light incidence part 141. Moreover, the shapes of second light incidence part 142 and 142' may be symmetry or asymmetry extended from two side of the first light incidence part 141. In this embodiment, the light incidence surface 12 may be parallel to the light emitting surface 13 or not parallel to the light emitting surface 13 of the main body 11.

The light source 2 having a circuit board 21 and a plurality of light bars 22 welded thereon and electrically connected thereto is disposed on the main body 11 of the light guide plate 1. The light bar 22 is composed of multiple light emitting diodes (LEDs) 221. A reflecting layer 23 is disposed on one surface of the circuit board 21 being located between each two light bars 22 for reflecting light generated from the LEDs 221. The light source 2 is disposed on the light incidence surface 12 of the main body 11 of the light guide plate 1, the light bar 22 is disposed in the accommodating groove 14 and corresponding to the optical layer 17 and the reflecting layers 23 which are adjacent the light bar 22 disposed in the accommodating groove 14. The circuit board 21 has a plurality of holes 24 for allowing supporting element (not shown) passing through. In this embodiment, the circuit board 21 may be one of rigid glass fabric printed circuit board and flexible printed circuit board.

Figure 12:
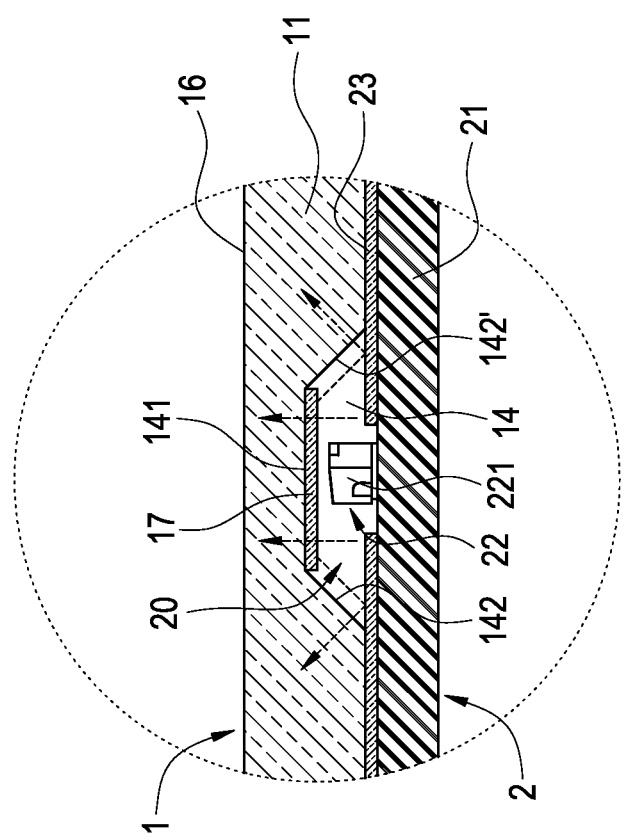
FIG. 12 is a schematic view showing light propagation route

Reference is made to FIG. 10 and FIG. 12, which are a cross sectional view of the backlight module according to the fifth embodiment and a schematic view showing light propagation route. When the main body 11 of the light guide plate 1 and the light source 2 are assembled, the circuit board 21 of the light source 2 is attached to the light incidence surface 12 of the main body 11, the light bar 22 is disposed in the accommodating grooves 14 and corresponding to the optical layer 17 disposed on the first light incidence part 141. A predetermined distance located between the light emitting diode 221 and the second light incidence part 142 and 142' is formed a light mixing space 20 to reduce the production of bright lines When the backlight module has assembled, the light bars 22 of the light source 2 can be clearly observed to dispose in the accommodating grooves 14. The optical layer 17 and the reflecting layer 23 diffuses or mists light generated from the LEDs and emitted thereon to the main body 11 of the light guide plate 1 to provide uniform illumination of each light guide surface 16. At this time, the light-separation grooves 15 prevent the light injected into the main body 11 from entering another light guide surface 16 adjacent to this light guide surface 16.

Figure 13:
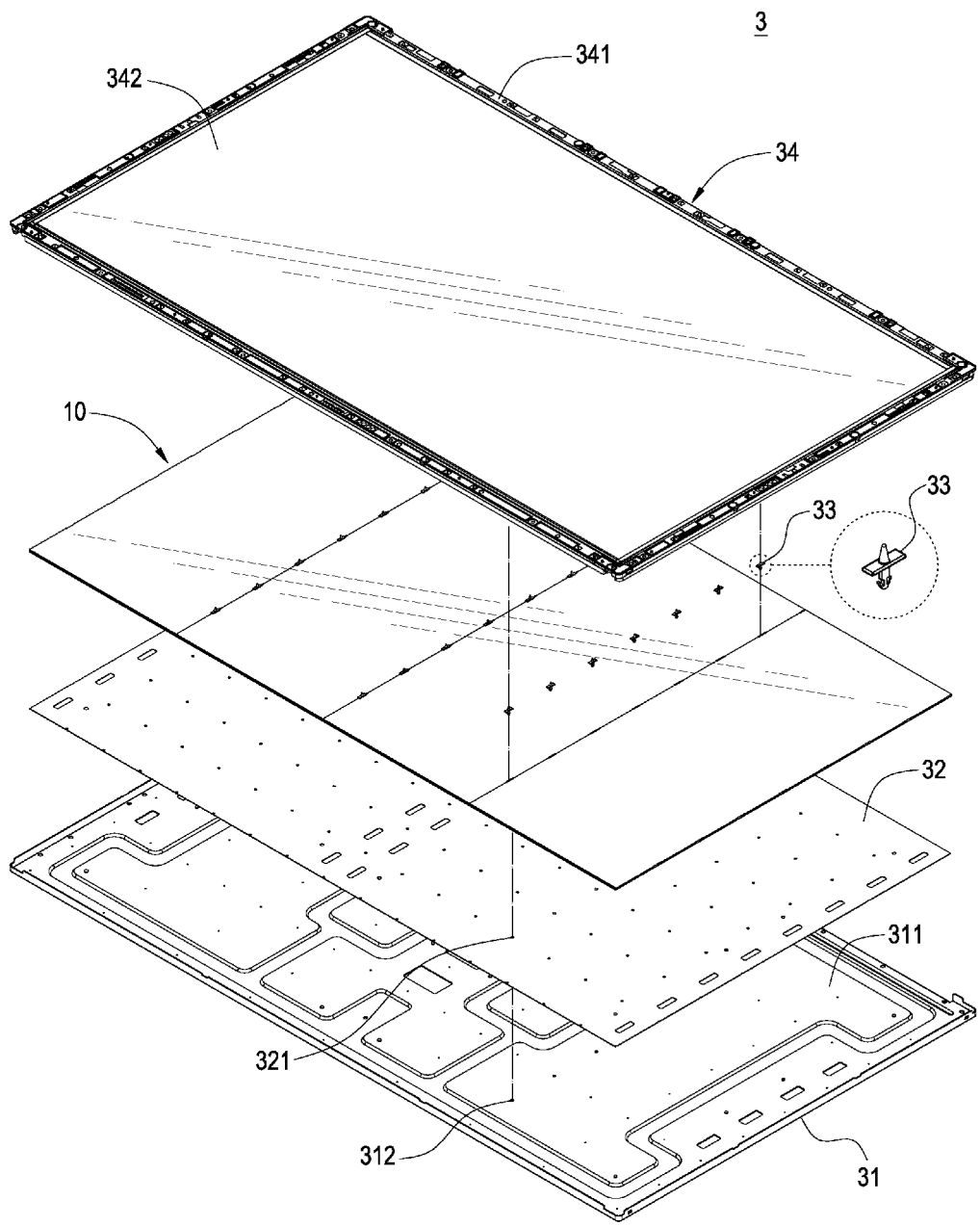
FIG. 13 is an exploded perspective view of a liquid crystal device of the present invention according to the present invention.
Figure 14:
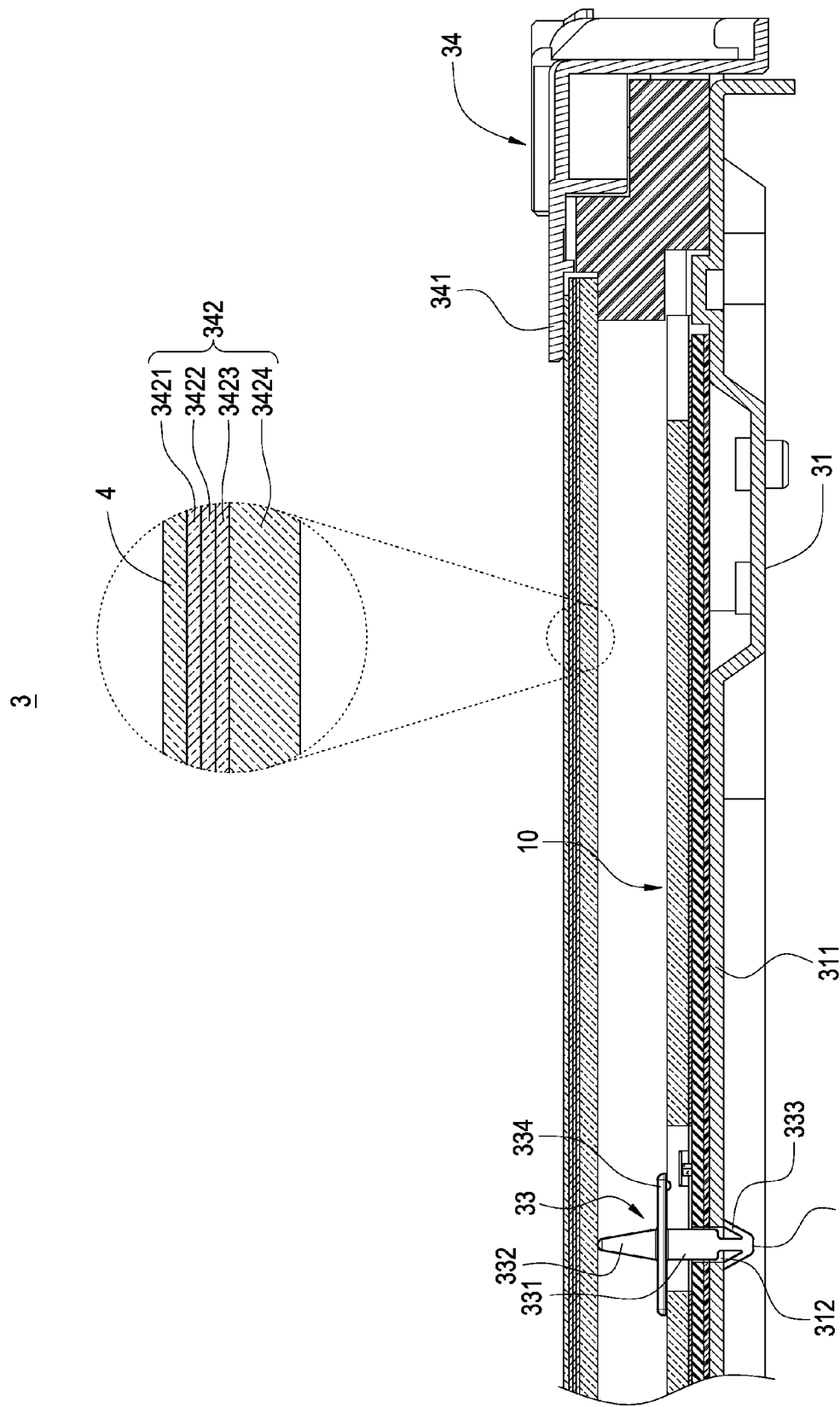
FIG. 14 is a partially cross sectional view of the liquid crystal device according to the present invention.

Reference is made to FIG. 13 and FIG. 14, which are an exploded perspective view and a partially cross sectional view of a liquid crystal device according to the present invention. The liquid crystal device includes the backlight module 10, a base 31, a thin firm 32, a plurality of supporting element 33 and a casing 34.

The base 31 has at least one platform 311 protruded from a surface of the base and the surface of the platform 311 has multiple fastening holes 312.

The thin film 32 is disposed on the surface of the platform 311, the thin film 32 has a multiple mounting holes 321 which are corresponding to the fastening holes 312. The backlight module 10 is disposed on the surface of the thin film 32.

The supporting element 33 has a supporting pillar 331, the supporting pillar 331 has a first end 332 and a second end 333. The first end 332 is of conical shape. The supporting element 33 has a pressing part 334 which is adjacent to the first end 332. The second end 333 has pushing part 335 of arrow-shape cross section. The supporting element 33 is penetrated the through-hole 18 of the light guide plate 1, the hole 24 of the circuit board 21, the mounting hole of the thin film 32 and the fastening holes 312 of the platform 311, the pressing part 334 presses the light emitting surface 13 of the light guide plate 1 and the pushing part 335 pushes on the rear surface of the platform 311 to fasten the backlight module 10 on the platform 311 of the base 31.

The casing 34 disposed on the edge of the backlight module 10 is composed of multiple edge frames 341. An optical module 342 is disposed on the casing 34 and located on the backlight module 10. The optical module 342 includes a dual brightness enhancement film (DBEF) 3421, a brightness enhancement film (BEF) 3422, a diffuser 3423 and a diffusing plate 3424. When assembling the casing 34, the base 31 and the backlight module 10, the diffusing plate 3324 presses the first end 332 of the supporting element 33.

Referring to FIG. 14 again, a liquid crystal displaying layer 4 is disposed on the optical module 342 for displaying images. The backlight module 10 provides light source for the liquid crystal layer 4 so as to form a liquid crystal displaying device.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A backlight module, comprising:
a light guide plate having a main body, the main body having a bottom light incidence surface and a top light emitting surface opposite to the light incidence surface, the main body having a plurality light-separation grooves, the light incidence surface having a plurality of accommodating grooves, each accommodating grooves having a first light incidence part and a second light incidence part being extended from a side of the first light incidence part, the light-separation grooves being perpendicular to the accommodating grooves and optically separating the light emitting surface into a plurality of light guide surfaces;
a light source comprising a circuit board and a plurality of light bars electrically connected thereto, the light source disposed on the light incidence surface of the main body of the light guide plate and the light bars disposed in the accommodating grooves;

wherein a predetermined distance located between the light bar and the second light incidence part forms a light mixing space;

wherein the main body has a plurality of through-holes which are corresponding to holes disposed on the circuit board;

a base having a platform on an inner surface thereof and a plurality of fastening holes being disposed on a surface of the platform; and a supporting element passing through the through-holes, the holes and the fastening holes for supporting an optical module and for fastening the backlight module on the platform.

2. The backlight module in claim 1, wherein the supporting element further comprising the optical module the optical module comprising a dual brightness enhancement film, a brightness enhancement film, a diffuser and a diffusing plate.

3. The backlight module in claim 1, wherein an optical layer is disposed on the first light incidence part and the optical layer is one of the reflector with penetrability and a diffuser.

4. The backlight module in claim 1, wherein a reflecting layer is disposed on the circuit board being located between each two light bars, the reflecting layer which is adjacent to the light bar is disposed in the accommodating groove.

5. The backlight module in claim 1, wherein the light-separation grooves are disposed on the light emitting surface.

6. The backlight module in claim 1, wherein the light-separation grooves are disposed on the light incidence surface.

7. The backlight module in claim 1, wherein the light bar is composed of a plurality of light emitting diode.

8. A liquid crystal displaying device, comprising:
a backlight module, comprising:
a light guide plate having a main body, the main body having a bottom light incidence surface and a top light emitting surface opposite to the light incidence surface, the main body comprising a plurality of light-separation grooves, the light incidence surface having a plurality of accommodating grooves, the accommodating grooves having a first light incidence part and a second light incidence part being extended from one side of the first light incidence part, the light-separation grooves being perpendicular to the accommodating grooves and optically separating the light emitting surface into a plurality light guide surfaces;

a light source comprising a circuit board and a plurality of light bars electrically connected thereto, the light source being disposed on the light incidence surface of the main body of the light guide plate and the light bars being disposed in the accommodating grooves, wherein a predetermined distance located between the light bar and the second light incidence part forms a light mixing space;

wherein the main body has a plurality of through-holes which are corresponding to holes disposed on the circuit board;

a base having a platform on an inner surface thereof and a plurality of fastening holes being disposed on a surface of the platform;

a supporting element passing through the through-holes, the holes and the fastening holes for supporting an optical module and for fastening the backlight module on the platform; and;

a liquid crystal displaying layer disposed on the backlight module.

9. The liquid crystal displaying device in claim 8, wherein an optical layer is disposed on the first light incidence part and the optical layer is one of the reflector with penetrability and a diffuser.

10. The liquid crystal displaying device in claim 8, wherein the light-separation grooves are disposed on the light incidence surface of the main body.

11. The liquid crystal displaying device in claim 8, wherein the light-separation grooves are disposed on the light incidence surface of the main body.

12. The liquid crystal displaying device in claim 8, wherein a reflecting layer is disposed on the circuit board being located between each two light bars, the reflecting layer which is adjacent the light bar is disposed for the accommodating groove.

* * * * *